2,867,037
COMPOSITION FOR SOLDERING METAL AND METHOD FOR USING SAME

Ledra M. Lawton, Buffalo, N. Y., assignor to General Motors Corporation, Detroit, Mich., a corporation of Delaware No Drawing. Application April 12, 1955
Serial No. 500,999

12 Claims. (Cl. 29—487)

This invention relates to a composition for soldering metals and to methods for using same, and more particularly to a zinc coating and fluxing composition for use with aluminum.

One of the problems associated with the fabrication and joining of aluminum to such metals as copper, brass, aluminum, zinc and iron has been that of developing a composition which would act effectively as both a fluxing and coating medium to enable a strong joint between the metal parts at the same time that the aluminum was given a coating to preclude corrosion. Likewise, from a production standpoint, it was desirable to develop the composition in such form as to be adapted for use in mass production assembly line operations. These problems are especially acute in the assembly of automotive radiators since the device is subjected to continuous shock and vibration as well as to the corroding effects of water, moisture and road salts under normal operating conditions.

It has been suggested in the prior art that a water solution of zinc chloride and sodium fluoride and containing a relatively high percentage of ammonium chloride was suitable for joining aluminum to other metals. I have discovered, after much experimentation, that such liquid compositions are unsuitable for the fabrication of aluminum for the following reasons: (1) upon heating the assembled device to the temperature required to coat and/or solder the aluminum, the dissociation of the salts sets up an exothermic heat reaction with the water which is of such magnitude as to melt the aluminum and destroy the unit, it being theorized that hydrogen chloride is formed with the water which then reacts with the aluminum; (2) the ammonium chloride is unstable in the mixture and upon heating is released as a characteristic cloud of fine, solid particles; (3) the presence of ammonium chloride in amounts greater than 4% by weight acts to prevent the formation of a continuous coating of the protective metal on the aluminum.

It is therefore an object of my invention to provide a soldering composition which is stable at the reaction temperature. It is another object of my invention to provide a soldering composition which is adapted to be handled as a liquid suspension without danger of destructive exothermic side reactions. It is another object of my invention to provide a liquid soldering compound which is adapted to form a continuous protective coating on the metal being treated. It is another object of my invention to provide a method for soldering metals.

These and other objects of my invention, as will be readily apparent from the description which follows, are achieved by using a composition comprising a mixture of substantially anhydrous metal fluoride, alkali metal chloride and zinc chloride, the mixture being preferably used as a suspension in a non-aqueous, substantially anhydrous liquid.

I have discovered that excellent results are obtained in coating and soldering aluminum by using a composition comprising:

| | |
|---|---|
| NaCl | percent__ 8–16 |
| NaF | do____ 1–5 |
| $NH_4Cl$ | do____ 0–4 |
| KCl | do____ 0–6 |
| $ZnCl_2$ | Remainder |

Though this mixture may be applied to the metal surfaces in powder form, it is preferred to use a liquid composition for ease and uniformity of treatment. I have found that this may be conveniently accomplished by grinding the powder in a ball mill together with the suspension liquid, the concentration most suitable being found to be is 4 to 6 lbs. of salt mixture for each gallon of liquid. I have found that anhydrous alcohol, glycol and/or chlorinated compounds such as isopropyl alcohol, ethylene glycol and perchloroethylene, respectively, are suitable for such purpose. However, I prefer to use isopropyl alcohol for the reason that the salt mixture is retained in suspension therein for much longer periods.

By means of my composition, aluminum may be given a coating of zinc by applying the mixture to the metal either in the powder form or in the liquid form by painting, spraying or dipping, followed by a heating operation to raise the temperature to 600–900° F. During this heating operation the salts dissociate and zinc is precipitated to form a Zn-Al alloy on the surface of the aluminum. In this same manner, aluminum may be joined to aluminum or other metals such as copper, brass, zinc, iron, etc., the Zn-Al surface alloy itself acting as the solder medium to bond the joining metals together. Likewise, aluminum may be joined to other material by use of any suitable solder such as silver lead, tin, zinc or alloys thereof.

The use of a separate solder material along with the coating and fluxing mixture of my invention is the preferred practice in the manufacture of automotive radiators. In this manner a good protective coating is obtained at the same time that a strong joint between the metal elements is assured.

I have found that when coating or soldering aluminum using Zn-Al alloy as described above, zinc solder or Zn-Al alloy solder, very satisfactory results are obtained by using a salt mixture comprising

| | Percent |
|---|---|
| $ZnCl_2$ | 86 |
| NaCl | 12 |
| NaF | 2 | about 4 lbs. of the mixture being suspended in isopropyl alcohol as described. By reason of extended experimentation, I have found that the sodium fluoride is necessary to aid the solvency of the aluminum oxide. Likewise, I have found that the sodium chloride produces a very fluid liquid in the molten state, which condition is essential for obtaining a continuous coating of zinc and a strong bond between the parts. It should be noted that ammonium chloride has been omitted, the reason being that I have found its presence to be detrimental to obtaining a continuous coating of zinc on the aluminum. However, when using lead alloy solder, i. e., about 30% tin-70% lead, about 2½% silver-97½% lead, I have found that ammonium chloride may be added in relatively small amounts to aid in the fluxing action and to obtain a somewhat better bond without serious deleterious effect on the continuity of the coating. In such operations I prefer to use a composition comprising

| | Percent |
|---|---|
| $ZnCl_2$ | 84 |
| NaCl | 12 |
| NaF | 2 |
| $NH_4Cl$ | 2 | about 5 lbs. of the mixture being suspended in one gallon of isopropyl alcohol as described. It should be noted that potassium chloride may be partially substituted for sodium chloride up to 6% by weight of the salt mixture, these salts being the common alkali metals. I have found that further substitution increases the fusion point of the mixture to excessively high temperatures. In this regard, I have found the alloy and soldering temperature for lead-type solders to be about 600–840° F., the preferred temperature being about 800° F., and that for zinc-type solders to be about 700–900° F., the preferred temperature being about 850° F.

Though the soldering composition of my invention may, of course, be used on all types of equipment involving the total or partial use of aluminum, I have found that my success in fabricating automotive radiators containing aluminum air baffle members was due to (1) my discovery of the NaCl-ZnCl$_2$ combination which results in very fluid and stable molten salt mixtures and produces a continuous protective coating on the aluminum, and (2) my use of non-aqueous suspension medium which effectively eliminates exothermic side reactions during the heating operation of my process.

In fabricating radiators or other devices containing aluminum, the several parts are coated with the non-aqueous suspension of my invention and are then assembled with a thin layer of solder between the elements. Excess liquid is removed by either draining the assembled piece or by blowing the piece in a dry air stream. The assembled device is then heated to the desired temperature to coat and solder the elements. The device is then given a washing treatment in hot water in order to remove excess salts. The washing bath contains a chelating compound such as critic acid in order to inhibit the formation of zinc and aluminum hydroxides. As described above, the device obtained by my process is characterized by the fact that the aluminum has a continuous protective coating and the joints between the metal elements are sound and strong.

It should be understood that though I have described my invention in terms of a preferred embodiment, I do not wish to be limited thereto since changes and modifications may be made within the full and intended scope of the claims which follow.

I claim:

1. A composition for coating and soldering metals consisting essentially of about 1–5% of a metal fluoride selected from the group consisting of sodium, potassium, calcium and magnesium fluoride, 8–16% sodium chloride, 0–4% ammonium chloride, and the balance being zinc chloride, said composition being substantially anhydrous.

2. A composition as set forth in claim 1 wherein said salts are suspended in a non-aqueous liquid.

3. A composition as set forth in claim 1 wherein substantially anhydrous potassium chloride is substituted for part of said sodium chloride in an amount not to exceed 6% by weight of the composition, said composition being suspended in a substantially anhydrous liquid to exclude water and avoid exothermic side reactions.

4. A composition for coating metals and for soldering aluminum to metals of the class belonging to copper, brass, aluminum, zinc, and iron consisting essentially of 8–16% NaCl, 1–5% NaF, 0–4% NH$_4$Cl, 0–6% KCl, the remainder being substantially all ZnCl$_2$, and said salts being anhydrous and being suspended in non-aqueous alcohol in the amount of 4–6 lbs. of salt per gallon of alcohol.

5. A composition for coating and soldering metals consisting of about 86% ZnCl$_2$, 12% NaCl, and 2% NaF, said salts being anhydrous and being suspended in a non-aqueous liquid.

6. A composition for coating and soldering aluminum in automotive radiators consisting of about 84% ZnCl$_2$, 12% NaCl, 2% NaF and 2% NH$_4$Cl, said salts being anhydrous and being suspended in non-aqueous alcohol in the amount of 5 lbs. of salt per gallon of alcohol.

7. A composition for coating and soldering metals consisting essentially of 8–16% NaCl, 1–5% NaF, 0–4% NH$_4$Cl, 0–6% KCl, the remainder being substantially all ZnCl$_2$, said salts being substantially anhydrous.

8. A composition for coating and soldering metals consisting essentially of 8–16% NaCl, 1–5% NaF, 0–4% NH$_4$Cl, 0–6% KCl, the remainder being substantially all ZnCl$_2$, said salts being substantially anhydrous and being suspended in a non-aqueous liquid.

9. In the process of fabricating automotive radiators having at least a portion thereof formed of aluminum, the steps of coating the metal parts with a coating and soldering mixture suspended in alcohol, said mixture consisting essentially of 86% ZnCl$_2$, 12% NaCl and 2% NaF, the suspension being non-aqueous, assembling said parts with a thin layer of zinc-type solder therebetween, heating to a temperature of about 850° F., and washing said parts in hot water to remove excess salts, the salts in said mixture being substantially anhydrous.

10. In the process of fabricating automative radiators having at least a portion thereof formed of aluminum, the steps of coating the metal parts with a coating and soldering mixture suspended in alcohol, said mixture consisting essentially of 12% NaCl, 2% NaF, 2% NH$_4$Cl, 84% ZnCl$_2$, the suspension being non-aqueous, assembling said parts with a thin layer of lead-type solder therebetween, heating to a temperature of about 800° F., and washing said parts in hot water to remove excess salts, the salts in said mixture being substantially anhydrous.

11. In the process of fabricating metal objects, the steps of coating the metal parts with a coating and solder mixture suspended in a non-aqueous liquid, said mixture consisting essentially of 8–16% NaCl, 1–5% NaF, 0–4% NH$_4$Cl, 0–6% KCl, the remainder being ZnCl$_2$, assembling said metal parts, heating said coated parts to a temperature of from 600 to 900° F., and washing said parts in hot water, said salts being substantially anhydrous.

12. In a process for fabricating metal objects having at least a portion thereof formed of aluminum, the steps of coating the metal parts with a coating and soldering mixture suspended in a non-aqueous liquid, said mixture consisting essentially of 8–16% sodium chloride, 1–5% of a metal fluoride selected from the group consisting of sodium, potassium, calcium and magnesium fluoride, 0–4% ammonium chloride, 0–6% potassium chloride as a substitute constituent for an equal amount of sodium chloride, the remainder being zinc chloride, assembling said parts with a thin layer of solder therebetween, heating to a temperature of from 600–900° F., and washing said parts in hot water, said mixture being substantially anhydrous.

References Cited in the file of this patent

UNITED STATES PATENTS

| 1,749,712 | Michel | Mar. 4, 1930 |
| 1,785,155 | Taylor | Dec. 16, 1930 |
| 2,179,258 | Howarth | Nov. 7, 1939 |
| 2,298,996 | Woods | Oct. 13, 1942 |
| 2,493,372 | Williams | Jan. 3, 1950 |
| 2,646,620 | Geddes et al. | July 28, 1953 |

OTHER REFERENCES

Welding Aluminum and Aluminum Alloys, 1946, page 72. Published by Reynolds Metals Co., Louisville, Kentucky.